(12) United States Patent
Jin (10) Patent No.: US 10,877,156 B2
(45) Date of Patent: Dec. 29, 2020

(54) LOCALIZATION BY LIGHT SENSORS (71) Applicant: VEONEER US INC., Southfield, MI (US)

(72) Inventor: Jin Jin, Lake Orion, MI (US)

(73) Assignee: VEONEER US INC., Southfield, MI (US)

( * ) Notice: Subject to any disclaimer, the term of this patent is extended or adjusted under 35 U.S.C. 154(b) by 365 days.

(21) Appl. No.: 15/933,524

(22) Filed: Mar. 23, 2018

(65) Prior Publication Data
US 2019/0293798 A1 Sep. 26, 2019

(51) Int. Cl.
G01S 17/00 (2020.01)
G01S 17/93 (2020.01)
G01S 17/06 (2006.01)

(52) U.S. Cl.
CPC .............. G01S 17/93 (2013.01); G01S 17/06 (2013.01)

(58) Field of Classification Search
USPC ................................................ 356/4.01, 5.01
See application file for complete search history.

(56) References Cited

U.S. PATENT DOCUMENTS

| | | | | |
|---|---|---|---|---|
| 5,150,336 A * | 9/1992 | Sullivan | ................... | G01S 13/42 367/103 |
| 7,024,278 B2 * | 4/2006 | Chiappetta | ........... | G05D 1/0225 700/245 |
| 7,720,554 B2 * | 5/2010 | DiBernardo | ............ | G01S 5/163 356/139.03 |
| 8,301,325 B2 * | 10/2012 | Traster | ..................... | G01S 15/88 701/23 |
| 8,427,537 B2 * | 4/2013 | Rouzes | ...................... | G06T 7/73 348/140 |
| 8,930,023 B2 * | 1/2015 | Gutmann | .............. | G05D 1/0234 700/245 |
| 8,972,052 B2 * | 3/2015 | Chiappetta | .............. | B60L 53/38 700/245 |
| 8,994,581 B1 * | 3/2015 | Brown | ................... | G01S 13/931 342/83 |
| 9,128,486 B2 * | 9/2015 | Chiappetta | ........... | G05D 1/0272 |
| 9,234,618 B1 * | 1/2016 | Zhu | ........................ | G05D 1/0088 |
| 9,360,310 B2 * | 6/2016 | Tan | ........................... | G01V 8/20 |
| 9,594,152 B2 * | 3/2017 | Ryan | ...................... | H04W 4/026 |
| 2004/0111184 A1 | 6/2004 | Chiappetta et al. | .......... | 700/245 |
| 2005/0213082 A1 | 9/2005 | DiBernardo et al. | .... | 356/139.03 |
| 2005/0213109 A1 | 9/2005 | Schell et al. | ................... | 356/614 |
| 2007/0179670 A1 | 8/2007 | Chiappetta et al. | .......... | 700/245 |
| 2010/0023195 A1 | 1/2010 | Traster | ............................. | 701/23 |
| 2010/0046953 A1 * | 2/2010 | Shaw | ...................... | H01S 5/423 398/115 |
| 2010/0082193 A1 | 4/2010 | Chiappetta | ........................ | 701/24 |
| 2010/0277583 A1 | 11/2010 | Rouzes | ........................... | 348/140 |

(Continued)

Primary Examiner — James R Hulka
(74) Attorney, Agent, or Firm — Christopher P. Maiorana, PC (57) ABSTRACT A system having a transceiver and a receiver. The transceiver may be configured to generate a light signal having a plurality of bands of light across a number of defined angles. Each of the light bands relates to a height of the transceiver relative to a road. The receiver may be configured to (i) receive the light signal and (ii) calculate a distance to the transceiver based on a detected one of the bands of light. The distance is used to provide localization in an autonomous vehicle application.

10 Claims, 5 Drawing Sheets

(56) References Cited

U.S. PATENT DOCUMENTS

| | | |
|---|---|---|
| 2011/0125323 A1 | 5/2011 | Gutmann et al. ............. 700/258 |
| 2011/0271738 A1* | 11/2011 | McGill .................. G01N 21/64 |
| | | 73/23.41 |
| 2012/0293651 A1* | 11/2012 | Kawamata ................ G01C 3/08 |
| | | 348/135 |
| 2013/0208256 A1* | 8/2013 | Mamidipudi ......... G01S 7/4815 |
| | | 356/4.01 |
| 2013/0271597 A1* | 10/2013 | Kawamata .............. G01S 11/12 |
| | | 348/140 |
| 2014/0046624 A1 | 2/2014 | Miettinen .................... 702/150 |
| 2015/0039262 A1 | 2/2015 | Tan et al. ...................... 702/150 |
| 2016/0047890 A1 | 2/2016 | Ryan et al. |
| 2017/0153319 A1* | 6/2017 | Villeneuve .......... H01S 3/08086 |
| 2017/0155225 A1* | 6/2017 | Villeneuve .............. G01S 17/06 |
| 2017/0199277 A1* | 7/2017 | Villeneuve .............. G01S 17/14 |
| 2017/0201059 A1* | 7/2017 | Villeneuve ............ G01S 7/4876 |
| 2017/0299721 A1* | 10/2017 | Eichenholz ........... G01S 7/4815 |

\* cited by examiner

LOCALIZATION BY LIGHT SENSORS

FIELD OF THE INVENTION

The invention relates to determining a location of an object generally and, more particularly, to a method and/or apparatus for implementing localization using light sensors in an autonomous driving environment.

BACKGROUND

Conventional approaches for implementing localization in an autonomous driving environment use LIDAR to re-create a 3D environment around a host vehicle. Using the 3D environment, a search is performed for an environment data cluster from a high definition map database in order to retrieve the correct position of the host vehicle on the map. Current LIDAR-based localizations have a number of problems. One problem is that the LIDAR localization approach is not effective in rural areas where there is no specific feature of the environment available around the road. Another problem is that the LIDAR localization approach is vulnerable to changes in the environment such as infrastructure removal or new constructions around the road. Another problem with the LIDAR localization approach is that too much data needs to be processed in order to run the localization algorithm. The price of LIDAR devices is relatively high.

It would be desirable to implement localization using light sensors in an autonomous driving environment.

SUMMARY

The invention concerns a system having a transceiver and a receiver. The transceiver may be configured to generate a light signal having a plurality of bands of light across a number of defined angles. Each of the light bands relates to a height of the transceiver relative to a road. The receiver may be configured to (i) receive the light signal and (ii) calculate a distance to the transceiver based on a detected one of the bands of light. The distance is used to provide localization in an autonomous vehicle application.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing localization by light sensors that may (i) implement one or more transceivers to generate a plurality of frequencies of light, (ii) implement a receiver to receive light from the transceivers, (iii) decode a distance of the receiver to the transceiver based on the band of light detected and/or (iv) be cost effective to implement.

Figure 1:
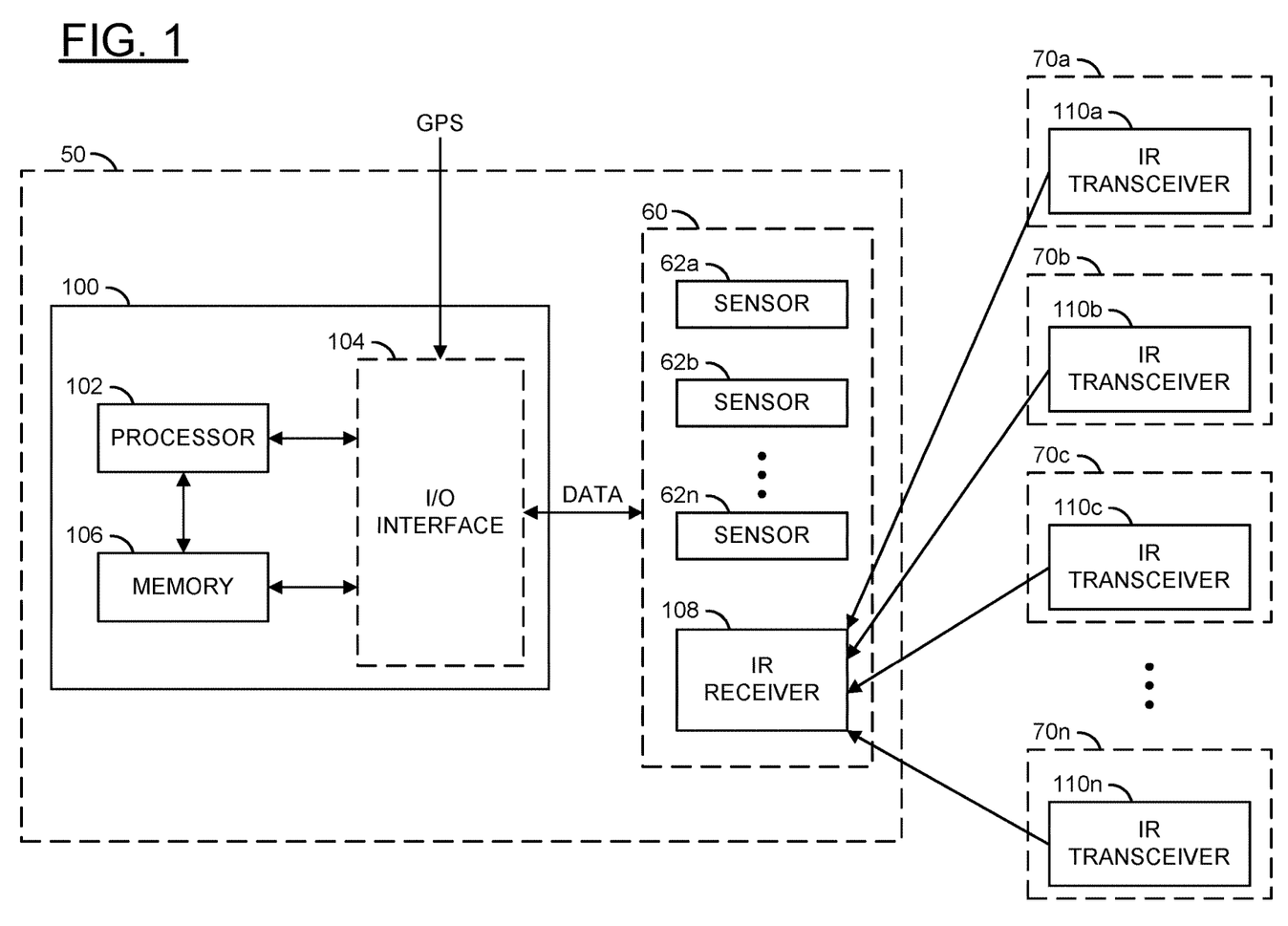
FIG. 1 is a diagram of an example embodiment of the present invention.

Referring to FIG. 1, a block diagram illustrating an example embodiment of the invention is shown. A system 50 is shown. The system 50 may be implemented as part of and/or installed within a vehicle (e.g., a car, a truck, a bicycle, an airplane, etc.). In an example, the system 50 may be implemented as components of a vehicle. In one example, the system 50 may be installed in a vehicle at a time of manufacturing. In another example, the system 50 may be installed as an after-market product in a vehicle. The implementation of the system 50 may be varied according to the design criteria of a particular implementation.

The system 50 may comprise a block (or circuit) 60 and/or a block (or circuit) 100. The block 60 may implement a sensor block. The circuit 100 may implement an apparatus (e.g., a device, a circuit, a module, an example embodiment of the invention, etc.). The system 50 may comprise other components (not shown). The number, type and/or arrangement of the system 50 may be varied according to the design criteria of a particular implementation.

The apparatus 100 may comprise a block (or circuit) 102, a block (or circuit) 104 and/or a block (or circuit) 106. The circuit 102 may implement a processor. The circuit 104 may implement an input/output interface. The circuit 106 may implement a memory. Details of the processor 102, the I/O interface 104 and/or the memory 106 may be described in greater detail in association with FIG. 2. The apparatus 100 may comprise other components (not shown). The number, type and/or arrangement of the components of the apparatus 100 may be varied according to the design criteria of a particular implementation.

The sensor block 60 is shown sending/receiving a signal (e.g., DATA). In an example, the signal DATA may comprise data exchanged between the sensor block 60 and the apparatus 100. The signal DATA may comprise data readings from the sensors 62a-62n. In some embodiments, the apparatus 100 may be configured to send information to the sensors 62a-62n via the signal DATA (e.g., calibration data).

The sensor block 60 may comprise a number of blocks (or circuits) 62a-62n and/or a block (or circuit) 108. The blocks 62a-62n may each comprise a sensor. The block 108 may comprise an infrared (IR) receiver. The sensors 62a-62n may be configured to detect, read, sense, and/or receive input. In some embodiments, each of the sensors 62a-62n may be configured to detect a different type of input. In some embodiments, each of the sensors 62a-62n may be the same type of sensor. In one example, the sensors 62a-62n may comprise video cameras (e.g., capable of recording video and/or audio). In another example, the sensors 62a-62n may comprise infrared (IR) sensors (e.g., capable of detecting various wavelengths of light). In some embodiments, the sensors 62a-62n may comprise vehicle sensors (e.g., speed sensors, vibration sensors, triaxial sensors, magnetometers, temperature sensors, gyroscopes, LIDAR, radar, accelerometers, inertial sensors, etc.). For example, the sensors 62a-62n may be configured to detect acceleration in an X direction (e.g., aX), acceleration an a Y direction (e.g., aY), acceleration an a Z direction (e.g., aZ), a yaw, a pitch and/or and roll. The implementation, type and/or arrangement of the sensors 62a-62n may be varied according to the design criteria of a particular implementation.

The I/O interface 104 may be configured to send/receive various input/output signals. In the example shown, the I/O interface 104 may send/receive the signal DATA. The I/O interface 104 may receive a signal (e.g., GPS). In one example, the signal GPS may be received from one or more GNSS satellites. In another example, the signal GPS may be received from an Advanced Driver Assistance Systems (ADAS) provider.

One or more infrastructure elements 70a-70n may be implemented as stationary towers or other type of infrastructure devices. Each of the infrastructure elements 70a-70n may have a corresponding transceiver 110a-110n. The transceivers 110a-110n may be implemented as infra red (IR) transceivers. In an example, the IR transceiver 110a may generate a light signal having a spectrum across a number of defined angles (or bands). Each of the angles may be used to decode a height of the transceiver (to be described in more detail in connection with FIG. 3).

The IR receiver 108 may receive light from one or more of the transceivers 110a-110n. Depending on the band of the light received, the IR receiver 108 may send information to the processor 102 through the I/O interface 104. The processor 102 may determine (or decode) a distance and/or height of the infrastructure element 70a-70n. The distance to the infrastructure elements 70a-70n may be used to provide localization in an autonomous vehicle application.

The signal GPS may provide road characteristics. In some embodiments, the road characteristics may comprise location coordinates (e.g., longitude and latitude). Generally, the road characteristics may comprise more information than location coordinates. The road characteristics may comprise ADAS data for various locations. The road characteristics may comprise altitude, road curvature data, road banking data, landmark information (e.g., information about nearby road signs and/or street lights), sensor readings from previous vehicles that have driven at that location, lane-specific information, etc. Generally, the road characteristics may comprise data usable to predict potential readings from the sensors 62a-62n for a particular location.

Figure 2:
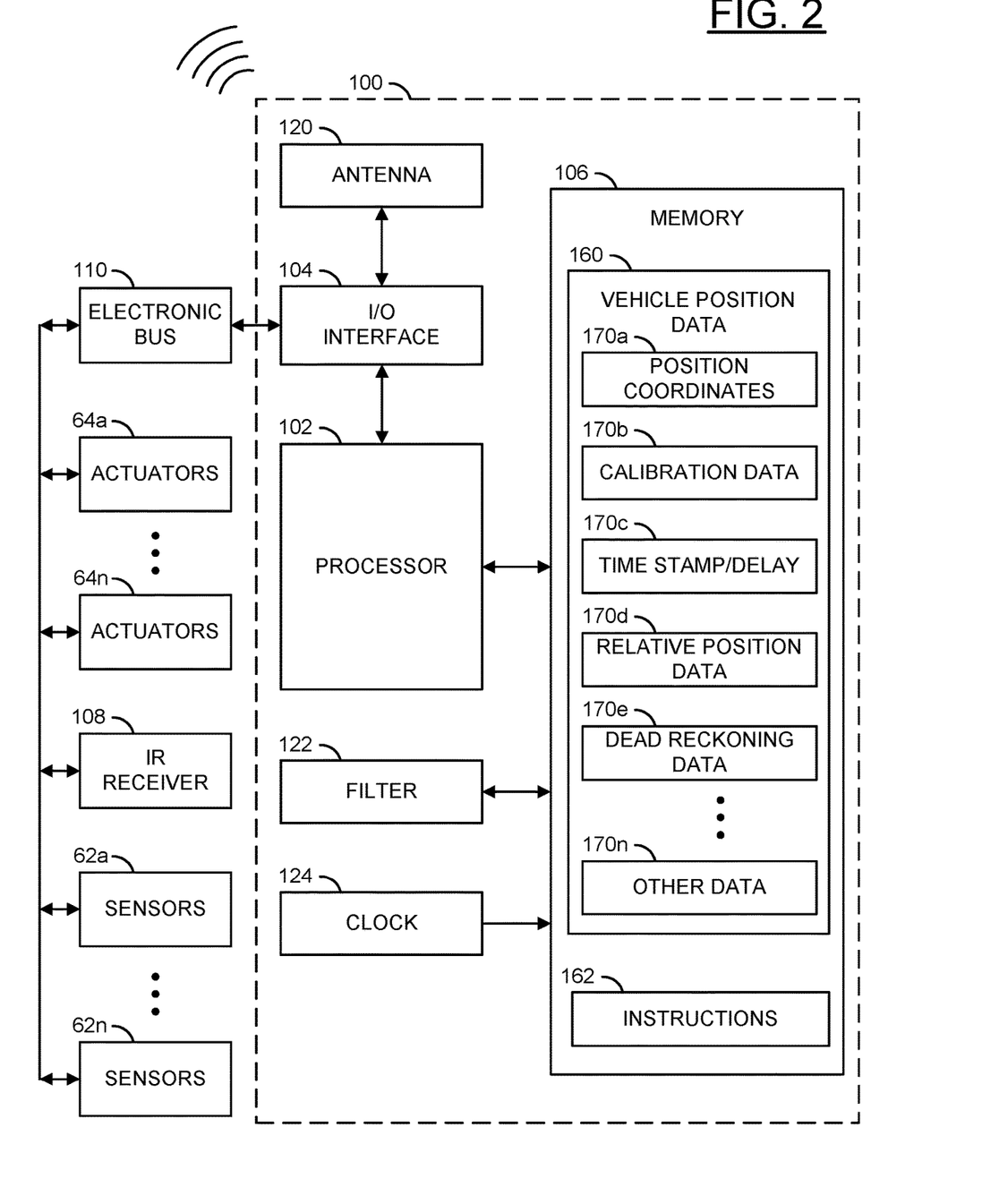
FIG. 2 is a diagram illustrating a module configured to determine localization by light sensors.

Referring to FIG. 2, a diagram illustrating a module configured to determine localization by light sensors is shown. The module 100 may transmit/receive the signal DATA and/or the signal GPS. The module 100 may send/receive other signals (not shown). The number and/or type of signals sent and/or received by the module 100 may be varied according to the design criteria of a particular implementation.

The module 100 may be connected to a block (or circuit) 110. The circuit 110 may implement an electronic bus. The electronic bus 110 may be configured to transfer data between the module 100 and the sensors 62a-62n, actuators 64a-64n and/or the IR receiver 108. In some embodiments, the electronic bus 110 may be implemented as a vehicle CAN bus. The electronic bus 110 may be implemented as an electronic wired network and/or a wireless network. Generally, the electronic bus 110 may connect one or more components of the vehicle 50 to enable a sharing of information in the form of digital signals (e.g., a serial bus, an electronic bus connected by wiring and/or interfaces, a wireless interface, etc.).

The module 100 generally comprises the processor 102, the I/O interface 104, the memory 106, a block (or circuit) 120, a block (or circuit) 122 and/or a block (or circuit) 124. The circuit 120 may implement an antenna. The circuit 122 may implement a filter. The circuit 124 may implement a clock. Other blocks (not shown) may be implemented (e.g., I/O ports, power connectors, interfaces, etc.). The number and/or types of circuits implemented by the module 100 may be varied according to the design criteria of a particular implementation.

The antenna 120 may be implemented as a dual band antenna capable of connecting to both a cellular network (e.g., to provide a potential connection option to base stations), a GNSS network (e.g., communication satellites) and/or a Wi-Fi network. In another example, the antenna 120 may be implemented as two or more antennas. For example, one antenna may be specifically designed to connect to the base station(s), while another antenna may be implemented to connect to the GNSS network satellites. The antenna 120 may be implemented as discrete antenna modules and/or a dual band antenna module. In some embodiments, the antenna 120 may be implemented as an off-board circuit (e.g., a component that is not part of the module 100). For example, the antenna 120 may send/receive data to/from the module 100 via the electronic bus 110. The implementation of the antenna 120 may be varied according to the design criteria of a particular implementation.

In some embodiments, the antenna 120 may be implemented as a transceiver configured to communicate (e.g., send and/or receive) data (e.g., radio signals). The transceiver 120 may receive data from the processor 102 to communicate with external devices (e.g., other of the modules 100a-100n). The transceiver 120 may receive communications from external devices (e.g., other of the modules 100a-100n) and transmit the communication signals to the processor 102. The transceiver 102 may be configured to communicate a Basic Safety Message (BSM) protocol and/or data outside the BSM protocol. The transceiver 120 may be configured to be compatible with one or more communications protocols (e.g., a Wi-Fi transceiver configured to perform dedicated short-range communication (DSRC), vehicle to vehicle (V2V) and/or vehicle to infrastructure (V2I) communication). The implementation of the transceiver 120 may be varied according to the design criteria of a particular implementation.

The processor 102 may be implemented as a microcontroller. The design of the processor 102 and/or the functionality of various components of the processor 102 may be varied according to the design criteria of a particular implementation. The processor 102 is shown sending data to and/or receiving data from the I/O interface 104 and/or the memory 106.

The memory 106 may comprise a block (or circuit) 160 and a block (or circuit) 162. The block 160 may store vehicle position data and/or sensor data. The block 162 may store computer readable instructions (e.g., instructions readable by the processor 102). The vehicle position data 160 may store various data sets 170a-170n. For example, the data sets 170a-170n may comprise position coordinates 170a, calibration data 170b, time stamp 170c, relative position data 170d, dead reckoning data 170e and/or other data 170n.

The position coordinates 170a may store location information data calculated and/or received by the module 100 from the GNSS satellites. The GNSS satellites may provide data from which a particular resolution of location information positional accuracy may be calculated from the signal GPS. In some embodiments, the position coordinates 170a may not provide sufficient positional accuracy for particular applications (e.g., lane detection, autonomous driving, etc.). In some embodiments, the position coordinates 170a may be calculated by the filter 122 and/or a component external to the module 100.

The calibration data 170b may comprise parameters (e.g., coefficients) used to transform data received from the sensors 62a-62n, presented to the actuators 64a-64n and/or received from the IR receiver 108. The calibration data 170b may provide many sets of coefficients (e.g., one set of coefficients for each of the sensors 62a-62n, the actuators 64a-64n and/or the IR receiver 108). The calibration data 170b may be updatable. For example, the calibration data 170b may store current values as coefficients for the sensors 62a-62n, the actuators 64a-64n and/or the IR receiver 108 and as the data from the sensors 62a-62n, the actuators 64a-64n and/or the IR receiver 108 drifts the module 100 may update the calibration data 170b in order to maintain accuracy. The format of the calibration data 170b may vary based on the design criteria of a particular implementation.

The time stamp/delay 170c may be used to determine an age of the vehicle position data 160 and/or the age of the IR sensor data read by the IR receiver 108. In one example, the time stamp 170c may be used to determine if the vehicle position data 160 should be considered reliable or unreliable (e.g., data older than a pre-determined threshold amount of time may be unreliable). For example, the time stamp 170c may record a time in Coordinated Universal Time (UTC) and/or in a local time. The implementation of the time stamp 170c may be varied according to the design criteria of a particular implementation.

The relative position data 170d may be used to augment (e.g., improve) a precision of the position coordinates 170a (e.g., the GNSS position) and/or provide an independent set of position data (e.g., cooperative position information). The relative position data 170d may be used to account (e.g., compensate) for the local conditions that may affect an accuracy of the position coordinates 170a. The relative position data 170d may provide higher precision location information than the position coordinates 170a. In an example, the relative position data 170d may be calculated using the data from the IR receiver 108.

The dead reckoning data 170e may be used to store past and/or present information to determine positions traveled by the vehicle 50. For example, the dead reckoning data 170e may store a previously determined position of the vehicle 50 (e.g., estimated speed, estimated time of travel, estimated location, etc.). The previously determined position may be used to help determine a current position of the vehicle 50. In some embodiments, the dead reckoning data 170e may be determined based on data from the sensors 62a-62n of the vehicle 50 (e.g., an on-board gyroscope and/or wheel click messages). The implementation and/or the information stored to determine the dead reckoning data 170e may be varied according to the design criteria of a particular implementation.

Various other types of data (e.g., the other data 170n) may be stored as part of the vehicle position data 160. For example, the other data 170n may store trend information for the calibration data 170b. For example, the other data 170n may store past data values of the calibration data 170b and/or current data values of the calibration data 170b. The past and current data values of the calibration data 170b may be compared to determine trends used to extrapolate and/or predict potential future values for the calibration data 170b. For example, the trend information may be used to continue to refine the calibration data 170b when the module 100 is operating in a pure dead reckoning mode (e.g., the location information fails the quality check). In some embodiments, the other data 170n may store various coordinate systems determined using a procrusting procedure and/or multi-dimensional scaling operations. In some embodiments, the other data 170n may store time stamp information.

The processor 102 may be configured to execute stored computer readable instructions (e.g., the instructions 162 stored in the memory 106). The processor 102 may perform one or more steps based on the stored instructions 162. In an example, the processor 102 may perform calculations based on the wavelength detected by the IR receiver 108. In another example, one of the steps of the instructions 162 may be executed/performed by the processor 102 and may determine a distance based on the detections by the IR receiver 108. The instructions executed and/or the order of the instructions 162 performed by the processor 102 may be varied according to the design criteria of a particular implementation.

The communication port 104 may allow the module 100 to communicate with external devices such as the sensors 62a-62n, the actuators 64a-64n and/or the IR receiver 108. For example, the module 100 is shown connected to the external electronic bus 110. The communication port 104 may allow the module 100 to receive information from the sensors 62a-62n of the vehicle 50 (e.g., an on-board gyroscope data, wheel click messages, LIDAR, etc.). For example, information from the module 100 may be communicated to an infotainment device for display to a driver. In another example, a wireless connection (e.g., Wi-Fi, Bluetooth, cellular, etc.) to a portable computing device (e.g., a smartphone, a tablet computer, a notebook computer, a smart watch, etc.) may allow information from the module 100 to be displayed to a user.

The filter 122 may be configured to perform a linear quadratic estimation. For example, the filter 122 may implement a Kalman filter. Generally, the filter 122 may operate recursively on input data to produce a statistically optimal estimate. For example, the filter 122 may be used to calculate the position coordinates 170a and/or estimate the accuracy of the position coordinates 170a. In some embodiments, the filter 122 may be implemented as a separate module. In some embodiments, the filter 122 may be implemented as part of the memory 106 (e.g., the stored instructions 162). The implementation of the filter 122 may be varied according to the design criteria of a particular implementation.

The clock 124 may be configured to determine and/or track a time. The time determined by the clock 124 may be stored as the time stamp data 170c. In some embodiments, the wavelength detected by the IR receiver 108 may be associated with one of the time stamp data 170c.

The module 100 may be configured as a chipset, a system on chip (SoC) and/or a discrete device. For example, the module 100 may be implemented as an electronic control unit (ECU). In some embodiments, the module 100 may be configured to calculate a position, velocity and time (PVT) solution, a relative positioning solution and/or a dead reckoning solution. For example, PVT may be considered a bare minimum output for navigation. In some embodiments, the module 100 may calculate a PVT solution and/or the dead reckoning solution. In some embodiments, the module 100 may be configured to receive a data stream that provides the PVT solution and may not determine the dead reckoning solution (e.g., the module 100 receives PVT data from an off-board component, determines the calibration data 170b and sends the calibration data 170b to an off-board component to determine the dead reckoning solution). In some embodiments, the module 100 may be configured to receive a data stream that provides the PVT solution and be configured to calculate the dead reckoning solution. The module 100 may be configured to supplement the PVT solution with the cooperative positioning solution.

In some embodiments, the module 100 may use an external processor (e.g., an off-board processor) to perform the calculations and/or perform operations. In one example, the external processor may be implemented as a distributed computing service configured to scale and/or provision resources on demand (e.g., cloud computing). For example, the module 100 may transmit data to the cloud computing service and one or more processors of the cloud computing service may perform the calculations and/or perform operations. The module 100 may receive the calculations from the cloud computing service and store the data in the memory 106. In some embodiments, the instructions 162 may be stored on an external memory. The implementation of using the external components to supplement a capability of the module 100 may be varied according to the design criteria of a particular implementation.

Generally, the module 100 receives and/or determines a PVT solution, a dead reckoning solution and/or a cooperative positioning solution (e.g., CoP). The module 100 may be configured to separate and/or extract the data component of the dead reckoning data 170e, the data component of the PVT solution (e.g., the location data) and/or the relative position data. In some embodiments, the instructions 162 may be executed by the processor 102 to provide responses to requests from other components of the vehicle 50. For example, a brake system of the vehicle 50 (e.g., one of the actuators 64a-64n) may request information from the module 100 before performing a particular response (e.g., to slow down).

The sensors 62a-62n may be configured to capture information from the environment surrounding the vehicle 50. The sensors 62a-62n may be vehicle sensors (e.g., speedometer, fluid sensors, temperature sensors, etc.). In some embodiments, data from the sensors 62a-62n may be used to determine the dead reckoning data 170e. In one example, the sensors 62a-62n may be various types of sensors configured to determine vehicle movement (e.g., magnetometers, accelerometers, wheel click sensors, vehicle speed sensors, gyroscopes, etc.). In another example, data from the sensors 62a-62n may be used to determine distances and/or directions traveled from a reference point. The types of sensors 62a-62n implemented may be varied according to the design criteria of a particular implementation.

The actuators 64a-64n may be components of the vehicle 50 configured to cause an action, move and/or control an aspect of the vehicle 50. For example, the actuators 64a-64n may be one or more of a braking system, a steering system, a lighting system, windshield wipers, a heating/cooling system, etc. In some embodiments, the actuators 64a-64n may be configured to respond to information received from the module 100 and/or the sensors 62a-62n. For example, if one of the actuators 64a-64n is a steering system, the steering system may receive information from the module 100 indicating that a collision with a nearby vehicle is likely and the steering system may respond by causing the vehicle 50 to change direction. The types of actuators 64a-64n implemented may be varied according to the design criteria of a particular implementation.

In some embodiments, the sensors 62a-62n and/or the actuators 64a-64n may be implemented to enable autonomous driving of the vehicle 50. For example, the sensors 62a-62n may receive and/or capture input to provide information about the nearby environment. The information captured by the sensors 62a-62n may be used by components of the vehicle 50 and/or the module 100 to perform calculations and/or make decisions. The calculations and/or decisions may determine what actions the vehicle 50 should take. The actions that the vehicle 50 should take may be converted into signals readable by the actuators 64a-64n. The actuators 64a-64n may cause the vehicle 50 to move and/or respond to the environment. For example, the module 100 may present an output that provides a relative position of the vehicle 50 to other vehicles. Other components may be configured to use the data provided by the module 100 to make appropriate decisions for autonomous driving.

Figure 3:
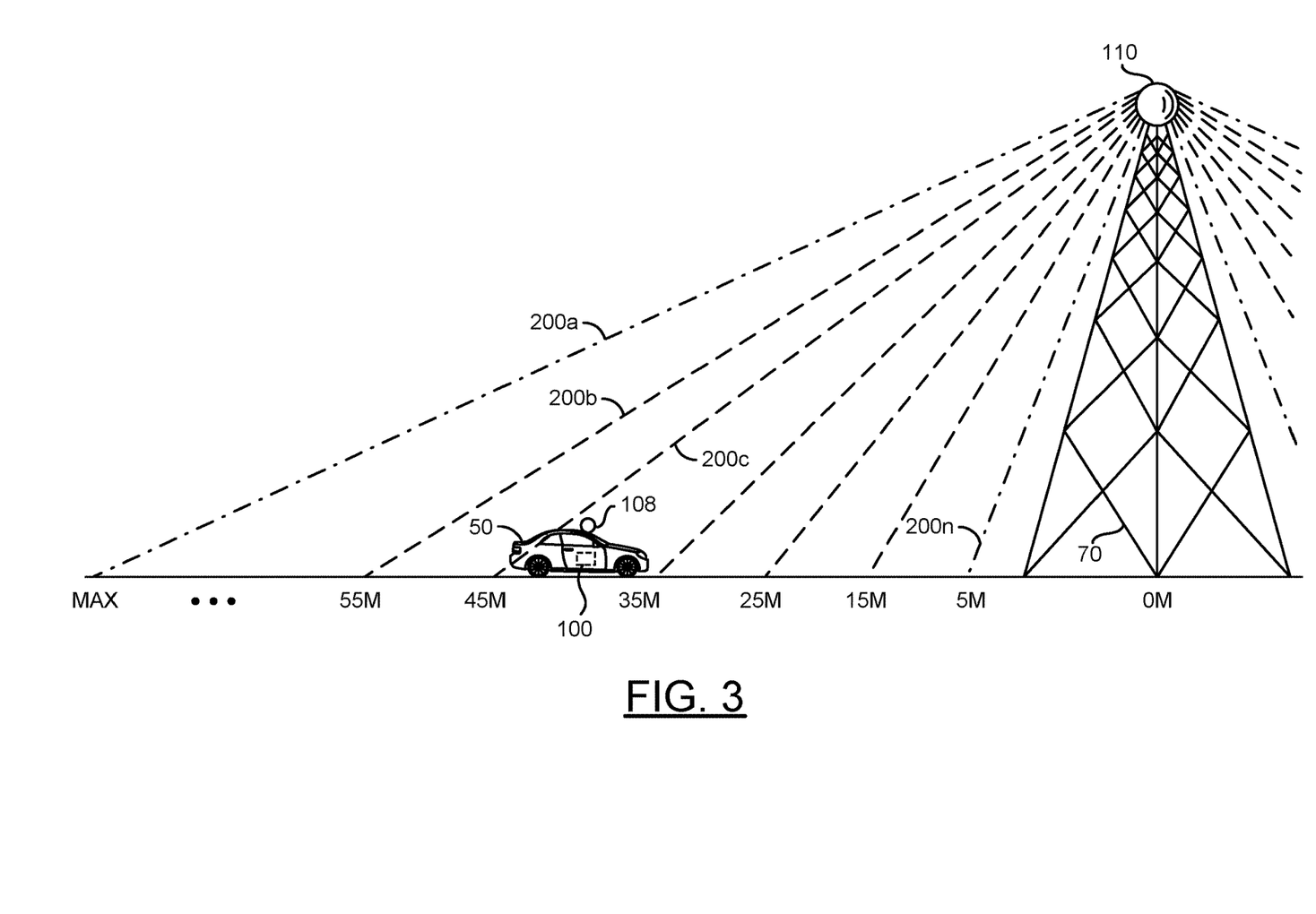
FIG. 3 is a diagram illustrating an implementation of an infrared light transceiver and a receiver.

Referring to FIG. 3, a diagram illustrating an environment of the infrared light transceiver 110 and/or receiver 108 is shown. The vehicle 50 is shown having the circuit 100 and the IR receiver 108. The transceiver 110 is shown located at the top of an infrastructure element 70. A number of lines 200a-200n define a number of wavelengths of light. Each of the lines 200a-200n may be used to determine a distance of the vehicle 50 from the infrastructure element 70. For example, the line 200n may represent a distance of 5 meters from the infrastructure element. The line 200c may represent a distance of 45 meters from the infrastructure element.

The host vehicle 50 may install the infrared receiver 108 on a location that has a clear view to the transceiver 110. In an example, the receiver 108 may be installed on the top portion of the vehicle 50. In an example, the road infrastructure element 70 may install the infrared transceiver 110 on an elevated (or top) portion of the vehicle 50 (e.g., elevated at least above ground level for perception by the receiver 108). An installation on a middle portion of the infrastructure element 70 may also be implemented. The transceiver 110 may project light beams with different wavelengths towards the road surface when the vehicle 50 moves. The transceiver 110 is generally elevated such that a certain number of light bands are viewable by the receiver 108 within a select distance from the transceiver 110. The receiver 108 on the road surface (mounted on the vehicle 50) may determine a distance to the transceiver 110 according to the wavelength of light currently received. If the receiver 108 receives signals from three or more different transceivers 110a-110n, the processor 102 may calculate a relative position using a process similar to GPS (to be described in more detail in connection with FIG. 5). The light transceivers 110a-110n may be designed to provide the various bands of frequencies of light. The transceiver 110 may be installed on existing infrastructure elements 70 to minimize installation costs. In a city, the transceiver 110 may be installed on existing buildings to minimize build out costs. If the environment changes, and the transceivers 110a-110n are still installed in the appropriate locations, the localization system may still operate. In an open rural area, a limited number of the infrastructure elements 70a-70n may be needed to allow the transceivers 110a-110n to make the localization system operate. The transceivers 110a-110n may be designed to generate light with a specific wavelength to be projected out in a specific band, or angle range. Two or more bands of light with different wavelengths may occupy the different angle ranges of the transceiver.

Figure 4:
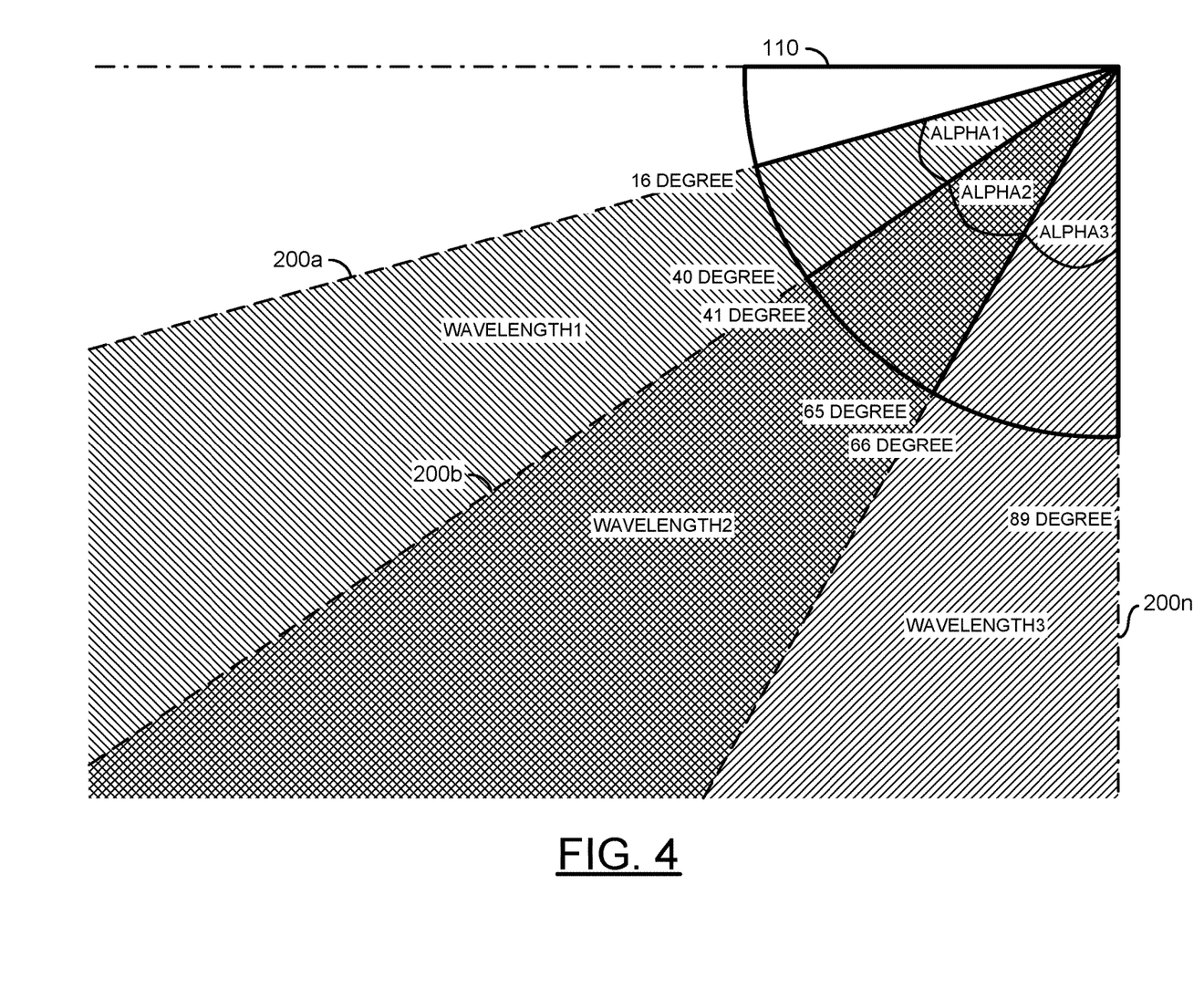
FIG. 4 is a diagram illustrating various wavelengths emitted by an infrared light transceiver.

Referring to FIG. 4, a diagram illustrating various wavelengths of light emitted by an infrared light transceiver is shown. The various wavelengths are divided into bands. Infrared light with a first wavelength (e.g., WAVELENGTH1) is shown occupying an angle range (e.g., ALPH1). The angle ALPH1 is shown from 16 degrees to 40 degrees. Infrared light with a second wavelength (e.g., WAVELENGTH2) is shown occupying an angle range (e.g., ALPH2). The angle ALPH2 is shown from 41 degrees to 65 degrees. Infrared light with a third wavelength (e.g., WAVELENGTH3) is shown occupying an angle range (e.g., ALPH3). The angle range ALPH3 is shown from 41 degrees to 65 degrees. The angles ALPH1, ALPH2, and/or ALPH3 are exaggerated for illustrative purposes. In an implementation, such as in FIG. 3, many angles representing many bands may be implemented. In an example implementation, hundreds of frequencies may be implemented. Each of the angles ALPH1, ALPH2, and/or ALPH3 may be in the range of one degree or less.

Each of transceivers 110a-110n may be configured to project light down to the surface of the road. As the vehicle 50 moves across the road, the band of detected light changes. In an example installation, each of the transceivers 110a-110n may be installed on an elevated portion of a respective one of the infrastructure elements 70a-70n. The transceivers 110a-110n may be mounted having a height of at least around 5 meters higher than the highest point of the road surface the bands of light are projected to. In an environment such as a parking lot, the infrastructure elements 70a-70n may be implemented in a position that provides a line of sight to the vehicle 50. The transceiver 110 may send the following information to the receiver 108 (i) a GPS coordinate of the transceiver 110, (ii) the wavelength of the bands of light the transceiver 110 projects to the road surface, and (iii) the distance ranges which are indicated by each band (or wavelength) of the light.

The receiver 108 may determine the wavelength of the infrared light received. The receiver 108 may be configured to receive more than one band of infrared light at the same time. Each band generally represents a different wavelength of light. The receiver 108 shall be able to receive following information from the transceiver 110 (i) a GPS coordinate of the transceiver 110, (ii) the wavelengths of the bands of light the transceivers 110a-110n project to the road surface, and/or the distance ranges which are indicated by each band (or wavelength) of the light.

The position of the receiver 108 (generally mounted on the host vehicle 50 while traveling on the road surface) may be used by the processor 102 to determine (or calculate) the distance to the infrastructure element 70 where the transceiver 110 is mounted. The distance may be calculated according to the wavelength of the light received from the transceiver 110 while the vehicle 50 is at a particular position.

In an example, if the receiver 108 is receiving infrared light with wavelength (e.g, WAVELENGTH3), then the processor 102 indicates that the distance between the receiver 108 and the transceiver 110 mounted on the infrastructure element 70 is within a range of 25 m to 35 m. If the receiver 108 is receiving infrared light with wavelength of (e.g., WAVELENGTH1), then the processor 102 indicates that the distance between receiver 108 and the transceiver 110 mounted on the infrastructure element 70 is within a range of 45 m to 55 m. Various other distances may be calculated based on other wavelengths. The ranges described are examples. The particular resolution implemented may be varied to meet the design criteria of a particular implementation. As the number of bands of wavelengths is increased, the resolution of the calculated distance range may increase.

Figure 5:
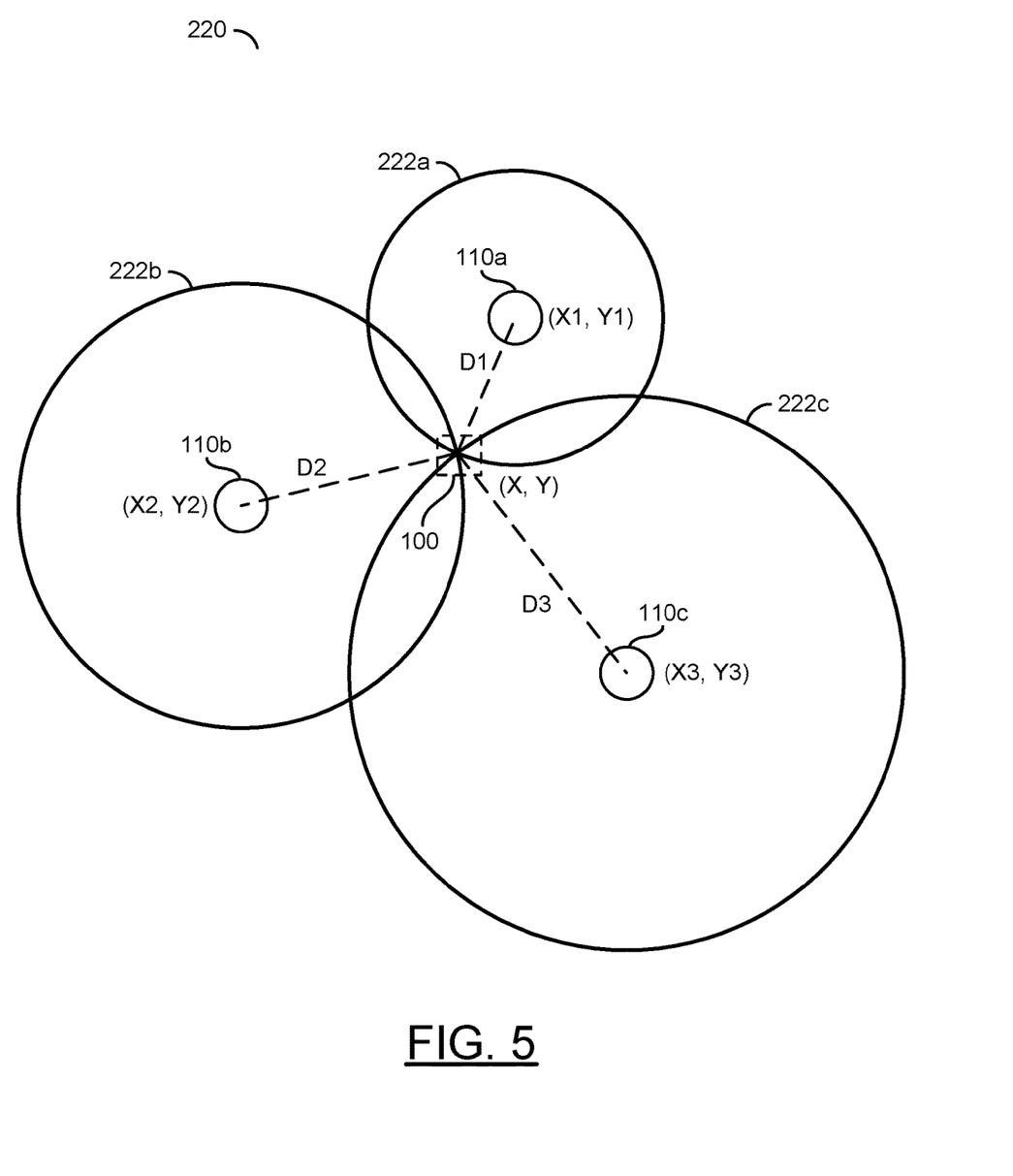
FIG. 5 is a diagram illustrating an example of determining a coordinate of a receiver.

Referring to FIG. 5, a diagram 220 illustrating determining coordinates for the receiver 108 is shown. In a case where there are at least three of the light transceivers 110a-110n in an area where the light receiver 108 on the host vehicle 50 can receive signals, a relative position may be calculated. The relative position of the host vehicle 50 may be determined according to a calculated position of the light transceivers 110a-110n. The calculation of the relative position may be similar to a determination made in a GPS system.

In the example shown, accurate GPS coordinates are assigned to each of the transceivers 110a-110n. The transceivers 110a-110n are also broadcasting this information to the receivers 108a-108n within range. The receiver 108 may determine the distance from transceivers 110a-110n based on the detected light band. In an example, the coordinate of the transceiver 110a may be defined as (X1, Y1). The coordinate of the transceiver 110b may be defined as (X2, Y2). The coordinate of the transceiver 110c may be defined as (X3, Y3). The distance from the receiver 108 to the transceiver 110a may be defined as D1. The distance from the receiver 108 to the transceiver 110b may be defined as D2. The distance from the receiver 108 to the transceiver 110c may be defined as D3. In such an example, the circle 222a may indicate an area where the host vehicle 50 may be located around transceiver 110a. The circle 222b generally indicates an area where the host vehicle 50 may be located around the transceiver 110b. The circle 222c generally indicates the area where the host vehicle 50 may be located around the transceiver 110c.

In this case, the position of the host vehicle 50 is at the area which is indicated by the point XY (e.g., having a coordinate (X, Y)). The X value and the Y value may be calculated by solving the following formula:

$$(X-X1)^2+(Y-Y1)^2=d1^2$$

$$(X-X2)^2+(Y-Y2)^2=d2^2$$

$$(X-X3)^2+(Y-Y3)^2=d3^2$$

In an example implementation where more than one of the transceivers 110a-110n are within the range of the receiver 108, different bands of light are generally used for each of the transceivers 110a-110n.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A system comprising:
   a transceiver (i) mounted to a stationary infrastructure element and (ii) configured to generate a light signal having a plurality of bands of light across a number of defined angles, wherein each of said bands of light relates to a height of said transceiver relative to a road; and
   a receiver configured to (i) receive said light signal and (ii) calculate a distance to said stationary infrastructure element based on a detected one of said bands of light, wherein said distance is (i) calculated using the detected band of light generated by the transceiver and (ii) used to provide localization in an autonomous vehicle application.

2. The system according to claim 1, wherein said transceiver is mounted to an infrastructure element.

3. The system according to claim 2, wherein said infrastructure element comprises a cellular tower.

4. The system according to claim 2, wherein said infrastructure element comprises a building.

5. The system according to claim 1, wherein a resolution of said system is increased by increasing a number of said bands of light generated.

6. The system according to claim 1, wherein said calculation is performed by a processor.

7. The system according to claim 6, wherein said distance is used by said processor along with Advanced Driver Assistance Systems (ADAS) data received by one or more second sensors.

8. An apparatus comprising:
a receiver configured to (i) receive a light signal and (ii) calculate a distance to a transceiver based on a detected one of a plurality of bands of light across a number of defined angles, wherein (A) each of said defined angles of the bands of light relates to a height of said transceiver relative to a road, (B) said transceiver is mounted to a stationary infrastructure element, and (C) said distance is used to provide localization in an autonomous vehicle application.

9. The apparatus according to claim 8, wherein said transceiver is configured to generate said light signal having said plurality of bands of light across said number of defined angles.

10. The apparatus according to claim 8, wherein at least three of said receivers which are not in line are used to calculate an absolute position of an automobile.

* * * * *